US012692141B2

(12) United States Patent
Kim et al.

(10) Patent No.: US 12,692,141 B2
(45) Date of Patent: Jul. 28, 2026

(54) SMART DISTRIBUTION VEHICLE AND CONTROL METHOD THEREFOR

(71) Applicants: Hyundai Motor Company, Seoul (KR); Kia Corporation, Seoul (KR)

(72) Inventors: Joo Han Kim, Suwon (KR); Young Jin Jung, Cheonan (KR); Jun Sik Lee, Yongin (KR); Jae Wook Lee, Yongin (KR); Hee Sang Yoon, Yongin (KR); Seok Hee Lee, Ansan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/872,613

(22) PCT Filed: Dec. 20, 2022

(86) PCT No.: PCT/KR2022/020793

§ 371 (c)(1),
(2) Date: Dec. 6, 2024

(87) PCT Pub. No.: WO2024/048864

PCT Pub. Date: Mar. 7, 2024

(65) Prior Publication Data

US 2025/0361130 A1 Nov. 27, 2025

(30) Foreign Application Priority Data

Sep. 1, 2022 (KR) ........................ 10-2022-0110789

(51) Int. Cl.
*B66F 9/075* (2006.01)
*B66F 9/06* (2006.01)
(Continued)

(52) U.S. Cl.
CPC ............ *B66F 9/0755* (2013.01); *B66F 9/063* (2013.01); *B66F 9/18* (2013.01); *B66F 9/20* (2013.01)

(58) Field of Classification Search
CPC ................. B66C 1/04; B66F 9/18; B66F 9/20
See application file for complete search history.

(56) References Cited

U.S. PATENT DOCUMENTS 2,821,317 A * 1/1958 Locke ..................... B66F 9/184 414/621
3,702,959 A * 11/1972 Le Gloan .................. H02P 7/03 318/440
(Continued)

FOREIGN PATENT DOCUMENTS

CN 101218165 A 7/2008
CN 210710585 U 6/2020
(Continued)

*Primary Examiner* — Tara Schimpf
*Assistant Examiner* — Ursula Lee Norris
(74) *Attorney, Agent, or Firm* — Fox Rothschild LLP

(57) ABSTRACT

Proposed are a smart distribution vehicle and a control method for the smart distribution vehicle. The smart distribution vehicle includes a fork arm, a fork which is coupled to the fork arm and which extends toward a front side of the fork arm, an electromagnet mounted on the front side of the fork arm, and a control part configured to control whether to supply a current to the electromagnet by determining whether an object has a magnetic property when the object is seated on the fork arm.

13 Claims, 12 Drawing Sheets

(51) Int. Cl.
*B66F 9/18* (2006.01)
*B66F 9/20* (2006.01)

(56) References Cited

U.S. PATENT DOCUMENTS

| | | | | | |
|---|---|---|---|---|---|
| 5,027,700 | A * | 7/1991 | Tschesche | B65G 61/00 414/791.3 |
| 5,343,145 | A * | 8/1994 | Wellman | G05D 1/0229 324/228 |
| 5,731,705 | A * | 3/1998 | Guinn | E21B 31/06 335/289 |
| 6,767,175 | B2 * | 7/2004 | Fujita | B66F 17/003 414/622 |
| 7,544,037 | B2 | 6/2009 | Haverfield et al. | |
| 2006/0175134 | A1 | 8/2006 | Schonauer | |
| 2011/0070058 | A1 * | 3/2011 | Lindstrom | B66F 9/182 414/592 |
| 2016/0236867 | A1 * | 8/2016 | Brazeau | B25J 5/007 |
| 2020/0148473 | A1 | 5/2020 | Iellimo | |
| 2022/0292448 | A1 * | 9/2022 | Schoening | G06K 19/07773 |

FOREIGN PATENT DOCUMENTS

| | | | |
|---|---|---|---|
| EP | 3 572 369 | A1 | 11/2019 |
| JP | 2002-338199 | A | 11/2002 |
| JP | 2004-244144 | A | 9/2004 |
| JP | 2006-076763 | A | 3/2006 |
| JP | 2021-109753 | A | 8/2021 |
| KR | 20-1994-0019297 | U | 8/1994 |
| KR | 20-0153965 | Y1 | 8/1999 |

* cited by examiner

[Fig. 1]
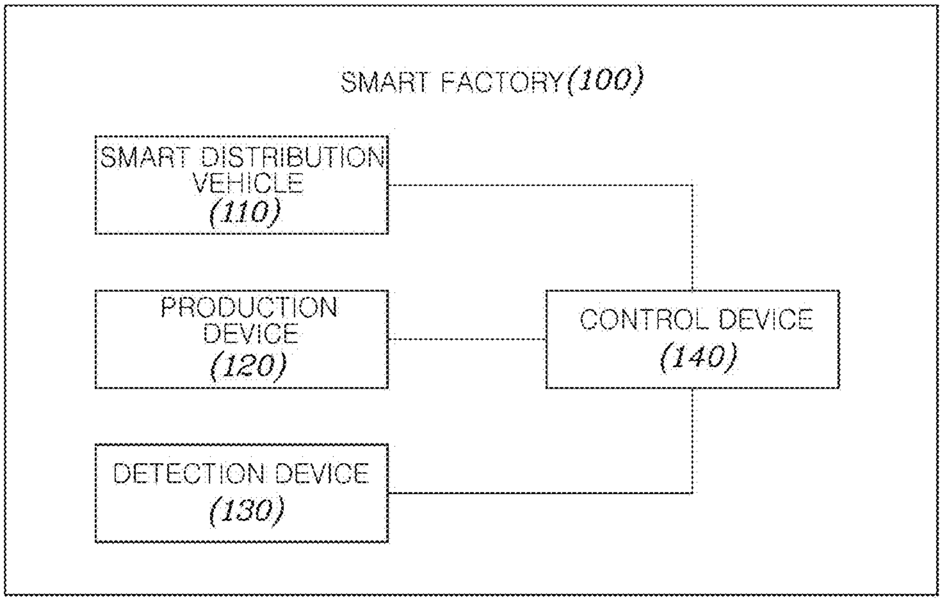

[Fig. 2]
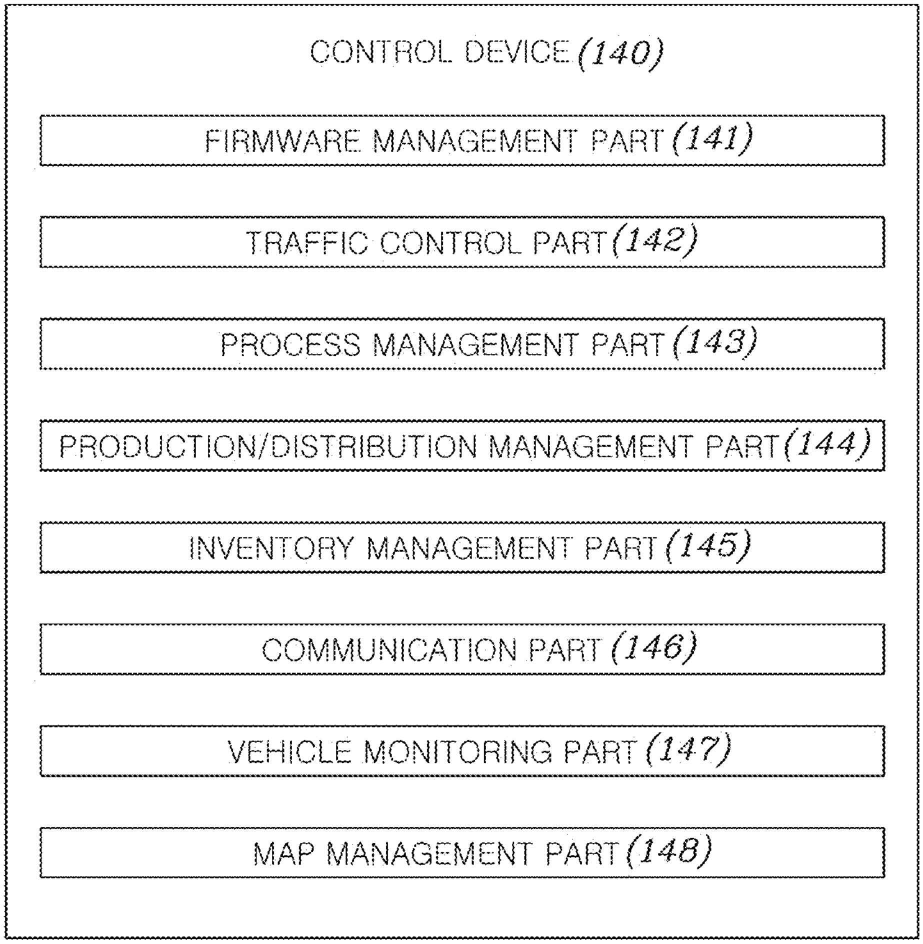

[Fig. 3]
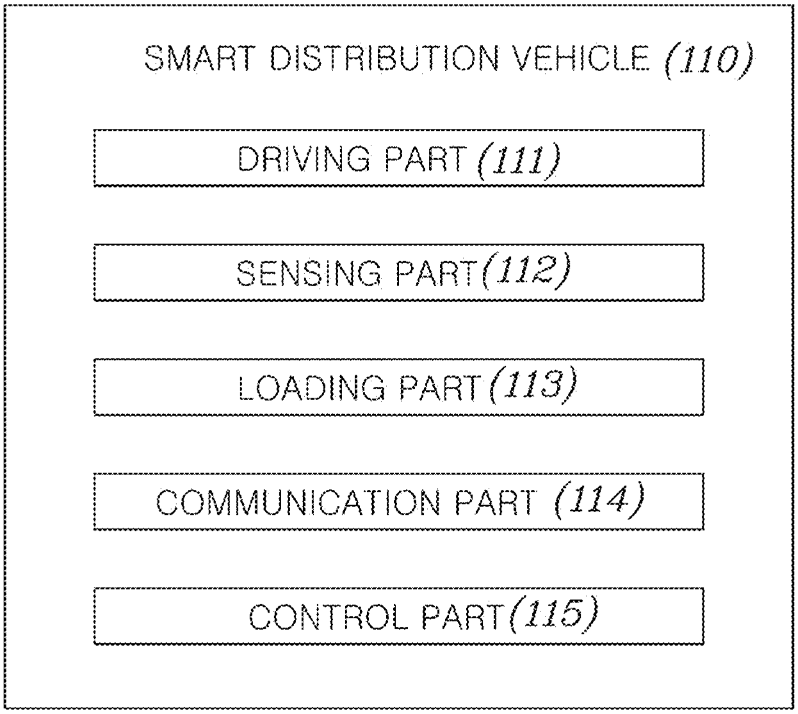

[Fig. 4]
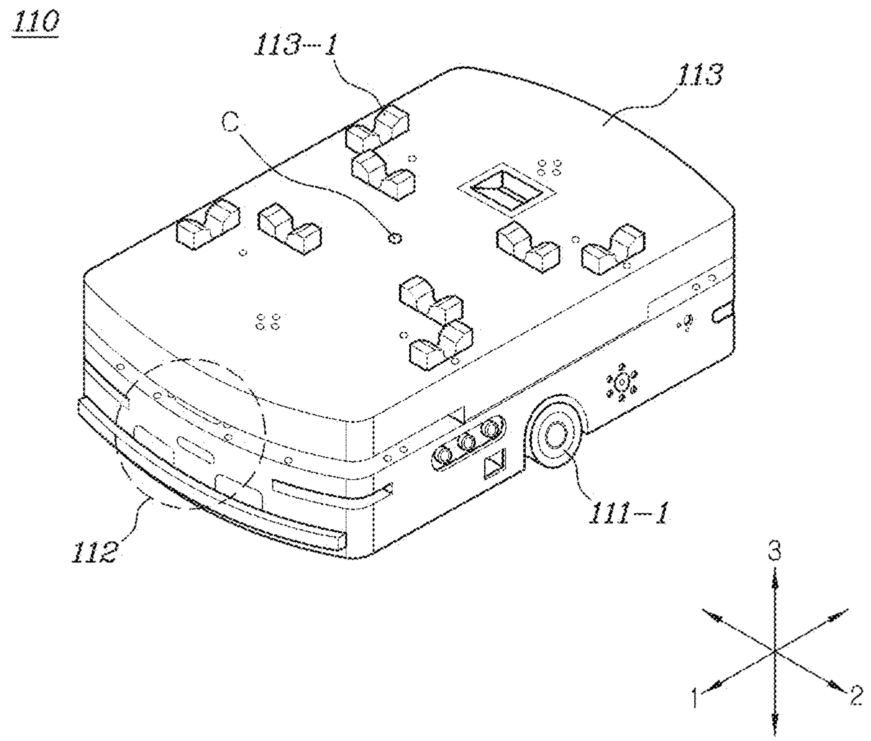

[Fig. 5]
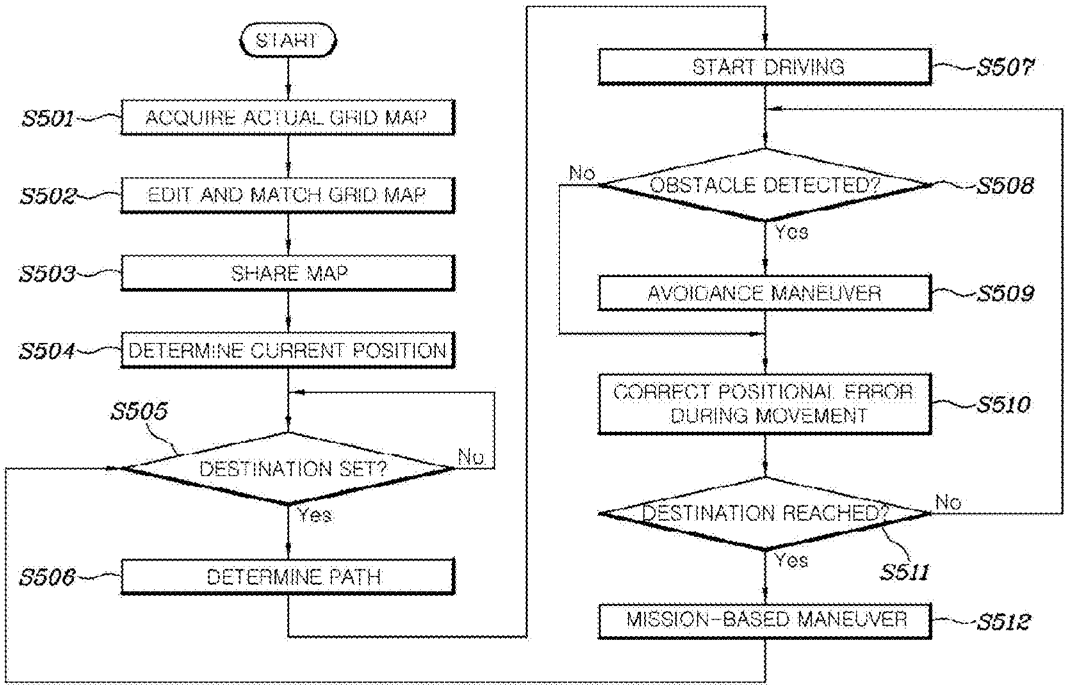

[Fig. 6]
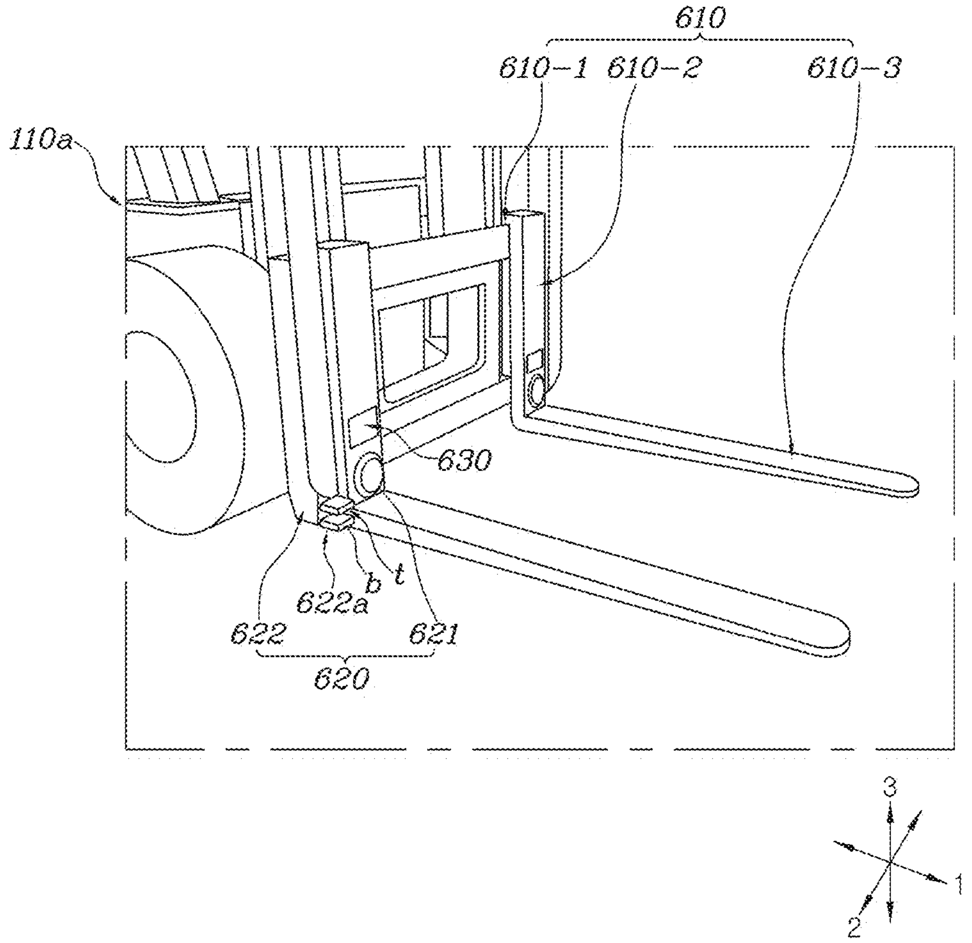

[Fig. 7]
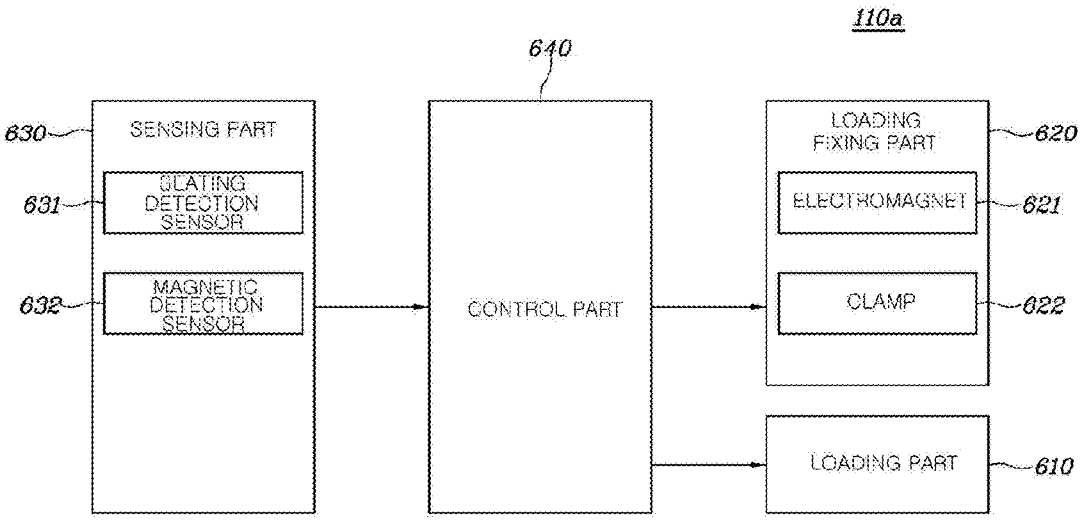

[Fig. 8]
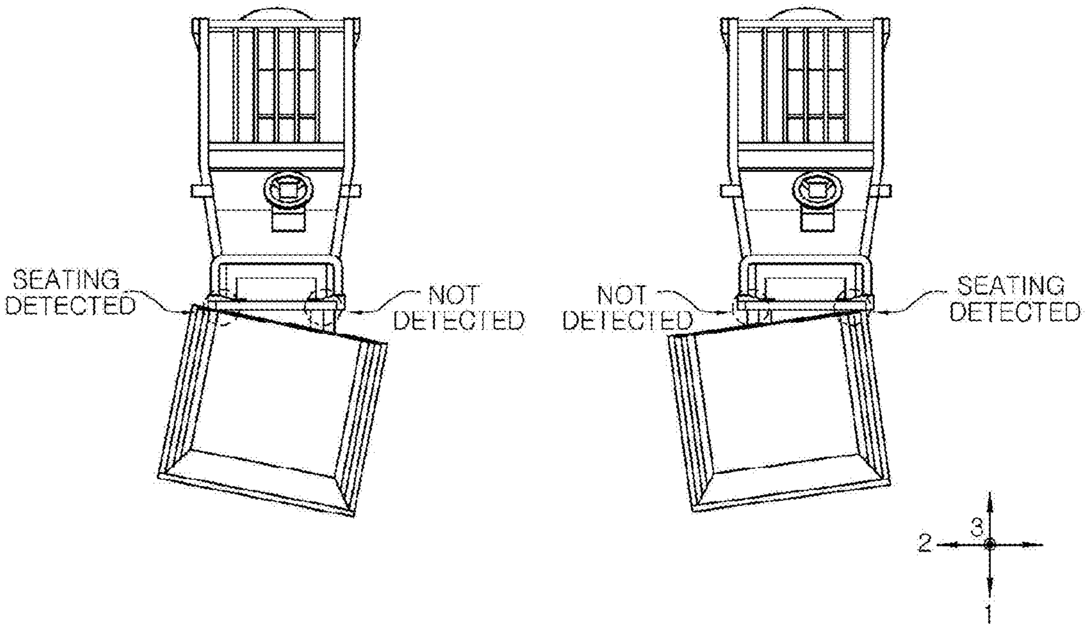

[Fig. 9]
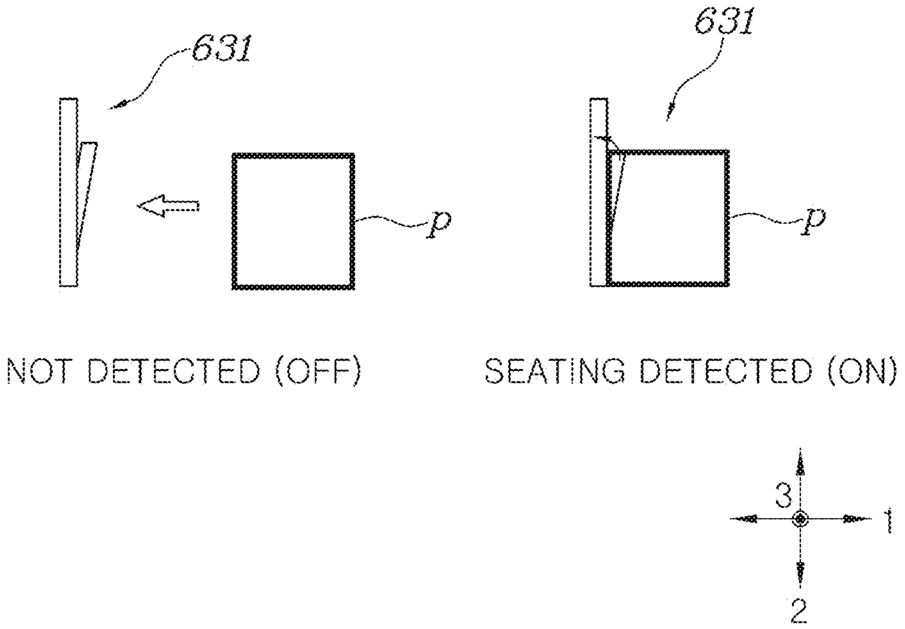

[Fig. 10]
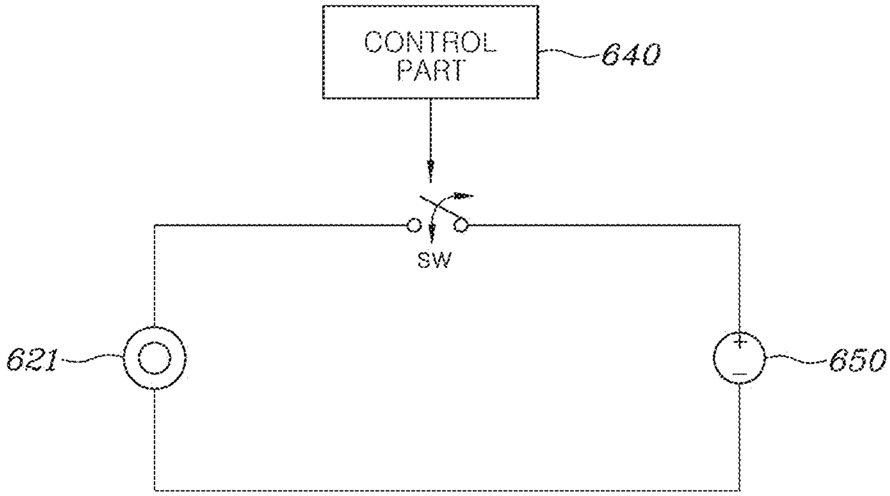

[Fig. 11]
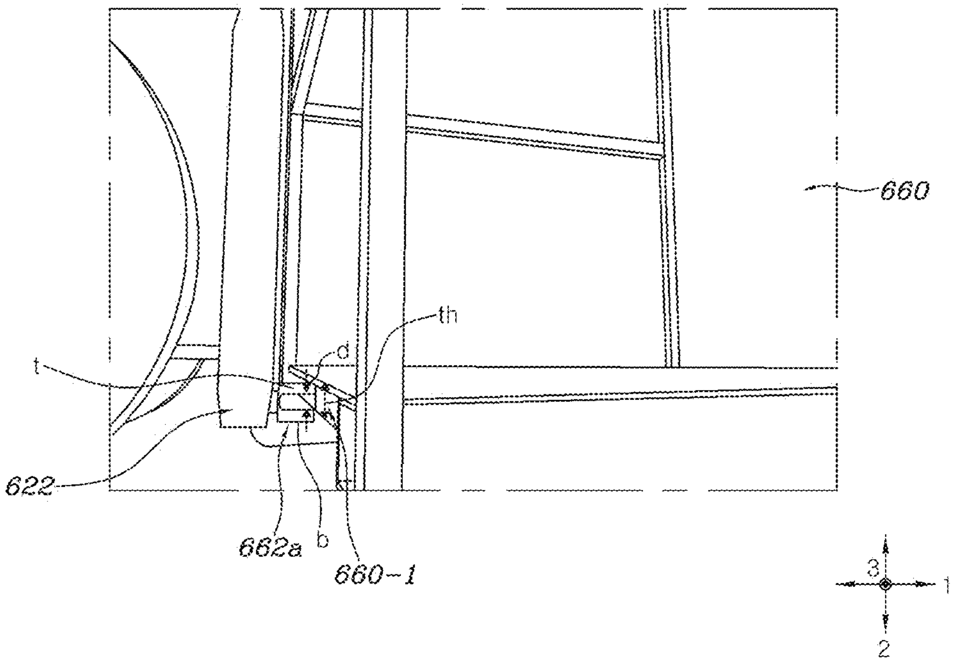

[Fig. 12]
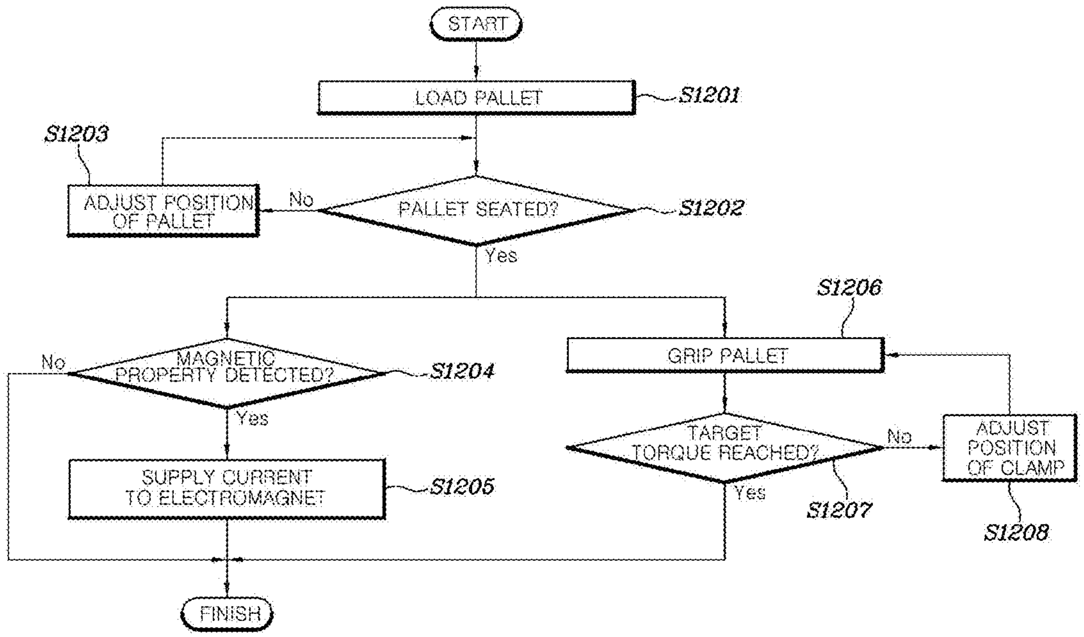

SMART DISTRIBUTION VEHICLE AND CONTROL METHOD THEREFOR

CROSS-REFERENCE TO RELATED APPLICATIONS

This application is the U.S. National Phase under 35 U.S.C. § 371 of International Patent Application No. PCT/KR2022/020793, filed on Dec. 20, 2022, which claims under 35 U.S.C. § 119(a) the benefit of Korean Application No. 10-2022-0110789, filed on Sep. 1, 2022, the entire contents of which is incorporated by reference herein.

TECHNICAL FIELD

The present disclosure relates to a smart distribution vehicle and a control method for the smart distribution vehicle capable of stably fixing a pallet to a loading part.

BACKGROUND ART

In not only general distribution warehouses and factories but also smart factories where products with different specifications are manufactured by using various components, smart distribution vehicles are being introduced so as to realize flexible and efficient supply and transport of components and so on.

A smart distribution vehicle is a concept collectively referred to as an Autonomous Mobile Robot (AMR), an Automated Guided Vehicle (AGV), an unmanned forklift, and so on. Such a smart distribution vehicle may be moved and operated according to a control of a control system.

In a smart factory and so on, a smart distribution vehicle transports a pallet that supports various loads, and it is necessary to prevent a safety accident in advance by fixing a pallet to a loading part of the smart distribution vehicle so that the pallet does not shake.

Since the pallet used in the smart factory and so on has various shapes and materials according to the types thereof, a method of simply mechanically fixing the pallet to the loading part of the smart distribution vehicle may cause a safety accident.

Therefore, a method for stably fixing pallets having various shapes and materials to a loading part of a smart distribution vehicle is required.

The foregoing is intended merely to aid in the understanding of the background of the present disclosure, and is not intended to mean that the present disclosure falls within the purview of the related art that is already known to those skilled in the art.

DISCLOSURE

Technical Problem

Accordingly, an objective of the present disclosure is to provide a method for stably fixing a pallet to a loading part regardless of a shape and material of the pallet loaded on a smart distribution vehicle.

The technical problems to be solved by the present disclosure are not limited to the above-mentioned problems, and other problems which are not mentioned will be clearly understood by those skilled in the art from the following description.

Technical Solution

In order to achieve the objective of the present disclosure, according to an aspect of the present disclosure, there is provided a smart distribution vehicle including: a fork arm; a fork which is coupled to the fork arm and which extends toward a front side of the fork arm; an electromagnet mounted on the front side of the fork arm; and a control part configured to control whether to supply a current to the electromagnet by determining whether an object has a magnetic property when the object is seated on the fork arm.

In addition, in order to achieve the objective of the present disclosure, according to another aspect of the present disclosure, there is provided a control method for a smart distribution vehicle, the control method including: loading an object on a fork that extends toward a front side of a fork arm; detecting whether the object is seated on the fork arm when the object is loaded on the fork; and controlling whether to supply a current to an electromagnet mounted on the front side of the fork arm by determining whether the object has a magnetic property when the object is seated on the fork arm.

Advantageous Effects

According to various aspects of the present disclosure as described above, the pallet may be stably fixed to the loading part regardless of the shape and material of the pallet loaded on the smart distribution vehicle.

The effects that can be obtained from the present disclosure are not limited to the above-mentioned effects, and other effects not mentioned herein will be clearly understood by those skilled in the art from the following description.

DESCRIPTION OF DRAWINGS

FIG. 1 is a block diagram illustrating an example of a configuration of a smart factory capable of being applied to embodiments of the present disclosure.

FIG. 2 is a block diagram illustrating an example of a configuration of a control device capable of being applied to embodiments of the present disclosure.

FIG. 3 is a block diagram illustrating an example of a configuration of a smart distribution vehicle capable of being applied to embodiments of the present disclosure.

FIG. 4 is a perspective view illustrating an example of an external appearance of the smart distribution vehicle capable of being applied to embodiments of the present disclosure.

FIG. 5 is a flowchart illustrating an example of a driving process of the smart distribution vehicle capable of being applied to embodiments of the present disclosure.

FIG. 6 is a perspective view illustrating an example of the external appearance of the smart distribution vehicle according to an embodiment of the present disclosure.

FIG. 7 is a block diagram illustrating an example of the configuration of the smart distribution vehicle according to an embodiment of the present disclosure.

FIG. 8 is a view illustrating an example of a process in which a seating detection sensor according to an embodiment of the present disclosure detects whether a pallet is seated on a fork arm.

FIG. 9 is a view illustrating an operation of a seating detection sensor implemented as a push-button switch according to an embodiment of the present disclosure.

FIG. 10 is a circuit diagram illustrating an example of an electromagnet control system included in the smart distribution vehicle according to an embodiment of the present disclosure.

FIG. 11 is a view illustrating an example of a process in which a clamp according to an embodiment of the present disclosure grips a lower end surface of the pallet.

FIG. 12 is a flowchart illustrating a control method for a smart distribution vehicle according to an embodiment of the present disclosure.

MODE FOR INVENTION

Hereinafter, exemplary embodiments disclosed in the present specification will be described in detail with reference to the accompanying drawings. In the present specification, the same or similar components will be denoted by the same or similar reference numerals, and a repeated description thereof will be omitted. In the following description, the expressions “module” and “part” contained in terms of constituent elements to be described will be selected or used together in consideration only of the convenience of writing the following specification, and the expressions “module” and “part” do not necessarily have different meanings or roles. Detailed description of known technologies will be omitted if it is determined that the detailed description of the known technologies obscures the embodiments of the present specification. In addition, the accompanying drawings are merely intended to easily describe the embodiments of the present specification, but the spirit and technical scope of the present specification is not limited by the accompanying drawings. It should be understood that the present specification is not limited to specific disclosed embodiments, but includes all modifications, equivalents and substitutes included within the spirit and technical scope of the present disclosure.

Terms including ordinals such as “first” or “second” used herein may be used to describe various elements, but the elements are not limited by the terms. The terms are used only for the purpose of distinguishing one constituent element from another constituent element.

When a component is referred to as being “connected” or “contacted” to another component, it should be understood that it may be directly connected or contacted to the other component, but other components may exist therebetween. On the other hand, when a component is referred to as being “directly connected” or “directly contacted” to another component, it should be understood that there is no other component therebetween.

Singular expressions include plural expressions unless the context clearly indicates otherwise.

It is to be understood that terms such as “including”, “having”, and so on are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

In addition, “unit” or “control unit” included in the names of an internal configuration of a smart distribution vehicle or a control system generally refer to a controller that controls a specific function and do not mean a generic function unit. For example, each controller may include a modem/transceiver for communicating with other controllers or sensors to control a function assigned thereto, a memory configured to store an operating system, logic commands, input/output information, and at least one processor configured to perform determination, calculation, and decision necessary to control the assigned function. According to the implementation, a single processor may be responsible for the operation of a plurality of controllers.

First, a configuration of a smart factory in which a smart distribution vehicle according to an embodiment is disposed and operated will be described with reference to FIG. 1.

FIG. 1 is a block diagram illustrating an example of a configuration of a smart factory capable of being applied to embodiments of the present disclosure.

Referring to FIG. 1, a smart factory 100 may include a smart distribution vehicle 110, a production device 120, a detection device 130, and a control device 140.

The smart factory 100 may be provided with a plurality of smart distribution vehicles 110, a plurality of production devices 120, and a plurality of detection devices 130 according to a production process and a target production speed of a product. Hereinafter, each component will be described.

First, the smart distribution vehicle 110 may include an Autonomous Mobile Robot (hereinafter, referred to as ‘AMR’ for convenience), an Automated Guided Vehicle (hereinafter, referred to as ‘AGV’ for convenience), and an unmanned forklift. In the smart factory 100, only one type of AGV or AMR may be operated according to an operation policy of the smart distribution vehicle 110, and the AGV and AMR may be operated together within a single smart factory 100.

Generally, the AGV performs a required operation (movement, direction change, stopping, and so on) within the smart factory 100 by recognizing and following a guide facility disposed on a floor for guiding the AGV. Here, the guide facility may refer to a marker (a spot, a 2D code, and so on) that is optically recognizable, a tag (for example, an NFC tag, an RFID tag, and so on) that is capable of being recognized in a non-contact manner at a short distance, a magnetic strip, a wire, and so on, but these are exemplary and are not necessarily limited thereto. The guide facility may be continuously disposed on the floor, or may be discontinuously disposed and spaced apart from each other. Since the AGV basically performs an operation by recognizing and following the guide facility, the guide facility is required to be pre-installed before operation. Therefore, when the AGV is required to be moved to a new path or an existing path is required to be modified, a new installation or modification of the guide facility is required to be physically performed. In addition, the AGV does not deviate from a path set through the guide facility. Therefore, generally, when an obstacle is detected on or around the path, the AGV is stopped until the detected obstacle disappears or the AGC is controlled separately. In the operation of the AGV, since the control device 140 is required to control the AGV based on the guide facility, the control device 140 may transmits commands to the AGV, such as ‘drive until the third marker is recognized’, ‘change a heading direction by 90 degrees when the third marker is recognized’, and so on from the current position, the commands being capable of being transmitted to the AGV either as an individual command unit or as a mission unit (for example, retrieval, supply, charging, patrol, and so on) that include a plurality of commands.

The AMR is capable of determining (i.e., positioning) the current position thereof through a peripheral detection, and the fact that the AMR is capable of performing a self-setting (path planning) by using a position and a map is the point that the AMR is most distinguished from the AGV. Therefore, when a map in which coordinates are compatible is shared between the AMR and the control device 140, the control device 140 may control the AMR in such a manner that the control device 140 indicates a path based on the coordinates to the AMR. In addition, when an obstacle is detected while the AMR is driven, the AMR may set an avoidance path, may avoid the obstacle, and may return to the existing path. A function in which the control device 140 sets a path of the AMR by using one or more transit coordinates may be referred to as global path planning, and a function in which the AMR sets a movement path or sets an avoidance path between the transit coordinates according to the global path planning may be referred to as local path planning.

A more detailed configuration of the smart distribution vehicle 110 will be described with reference to FIG. 3 and FIG. 4, and a driving control process of the AMR will be described later with reference to FIG. 5.

Next, the production device 120 may refer to a device (for example, a robot arm, a conveyor belt, and so on) that performs a production process of a product in the smart factory 100. Furthermore, in a broader sense, the production device 120 may refer to a device disposed so as to assist in performing a mission such as entering and exiting of the smart distribution vehicle 110 when the production process is performed by a person. A device disposed so as to assist in performing a mission may be a device that detects a state of a designated position where a pallet transported by the smart distribution vehicle 110 is capable of being placed or collected within an area in which a specific production process is performed, a device that determines a process progress rate, a mechanism blocking entering and exiting within area, or the like, but is not limited thereto.

For example, the production device 120 may be controlled through a Programmable Logic Controller (PLC), and may communicate with the control device 140 in relation to the process progress.

The detection device 130 may perform a function of acquiring information for determining a situation in the smart factory 100 and then transmitting the information to the control device 140. For example, the detection device 130 may include a camera, a proximity sensor, and so on, but is not necessarily limited thereto.

The control device 140 may acquire information necessary for the operation of the smart factory 100 or may control each component by communicating with the components 110, 120, and 130 described above. For example, the control device 140 may perform tasks such as dispatching the smart distribution vehicle 110, setting a route, assigning a mission, managing a process for each product, managing a material, and so on.

In the implementation of the control device 140, the control device 140 may include a local control system (ACS: AMR/AGV Control System) configured to control a surrounding process facility based on a position of the AGV/AMR and configured to perform mission-based control of the AGV/AMR, and may include an integrated control device (MoRIMS: Mobile Robot Integrated Monitoring System) configured to integrate and control at least two local control systems. From each of the plurality of local control devices, the integrated control device may control a state and a path of all of the smart distribution vehicle 110 in the smart factory 100 and may control distribution flow setting and a traffic. For example, when the local control system (ACS) is provided as a unit of a smart distribution robot of the same manufacturer or the same type, the integrated control system may perform an integrated control for preventing collision, such as analyzing a bottleneck level of a cross/overlap area, controlling acceleration/deceleration of driving, recreating an avoidance path, and so on by controlling traffic distribution between the different types based on information acquired through the plurality of local control systems (ACS).

In addition, the integrated control device may also have a Manufacturing Execution System (MES) as an upper-level control subject of the integrated control device, and the MES may be linked with an automation scheduler (APS: Advanced Planning & Scheduling).

In addition to the component 110, 120, 130, and 140 of the smart factory 100 described above, a device for realizing intercommunication between each component such as a beacon, a repeater, an Access Point (AP), and so on, a charger for charging the smart distribution vehicle 110, a loading space for storing or loading a part, a traffic light, a barrier, a waiting space for the idle smart distribution vehicle 110, and so on may be appropriately disposed in the smart factory 100.

Hereinafter, components of the control device 140 capable of being applied to embodiments of the present disclosure will be described with reference to FIG. 2.

FIG. 2 is a block diagram illustrating an example of a configuration of a control device capable of being applied to embodiments of the present disclosure. Each component illustrated in FIG. 2 is mainly illustrating components related to embodiments of the present disclosure, and may include more or less components in the actual implementation of the control device 140.

Referring to FIG. 2, the control device 140 may include a firmware management part 141, a traffic control part 142, a process management part 143, a production/distribution management part 144, an inventory management part 145, a communication part 146, a vehicle monitoring part 147, and a map management part 148.

The firmware management part 141 may acquire the latest firmware of the smart distribution vehicle 110 through the communication part 146, and may transmit the firmware to the smart distribution vehicle 110 so that the firmware update is performed, so that the firmware of the smart distribution vehicle 110 may be kept up-to-date.

The traffic control part 142 may control the traffic light and the barrier based on a path of the smart distribution vehicle 110, and may also re-determine a path of the smart distribution vehicle 110 according to traffic.

The process management part 143 may define a process for each product, and may manage a mission such as a process progress rate, a progress position, and so on.

The production/distribution management part 144 may dispatch the smart distribution vehicle 110 based on the mission.

The inventory management part 145 may manage the position and the quantity of each material, and such information may be useful for more efficient process operation, such as dispatching the smart distribution vehicle 110 to a destination in advance for pallet pickup or retrieval before an actual assembly/consumption of the material is detected.

The communication part 146 may communicate with internal components of the smart factory 100, such as the smart distribution vehicle 110, the production device 120, and the detection device 130, as well as with external objects such as a firmware update server and so on.

The vehicle monitoring part 147 may monitor a position, a path, a battery status, a communication status, a powertrain status, and so on of each of the smart distribution vehicles 110. Here, the path is a concept including a waypoint-based global path and a real-time local path. In addition, the battery status may include a voltage, a current, a temperature, peak values of the voltage and the current, a State Of Charge (SOC), a State Of Health (SOH), and so on. The communication status may include information about a currently active communication protocol (Wi-Fi and so on), a connected AP, a distance from the AP, a channel being used, and so on. In addition, the powertrain status may include a load, a temperature, an RPM, and so on of a driving system.

In addition, the vehicle monitoring part 147 may check a mission, an operation mode, a firmware version, and so on currently assigned to each of the smart distribution vehicles 110.

The map management part 148 may acquire grid map-type map data acquired by the AMR while the AMR in the smart distribution vehicle 110 is driving inside the smart factory 100, and may provide a tool that allows a factory manager to edit the acquired map data. By editing the map data, a zone in which the smart distribution vehicle 110 performs at least one preset operation when the smart distribution vehicle 110 enters the zone, a virtual lane, an intersection, an entry prohibition area, and so on, but these are examples and are not necessarily limited thereto. In addition, thorough the communication part 146, the map management part 148 may distribute the map to the remaining smart distribution vehicles 110 other than the smart distribution vehicle 110 that initially acquired the grid map through actual driving.

Next, the smart distribution vehicle will be described with reference to FIG. 3 and FIG. 4.

FIG. 3 is a block diagram illustrating an example of a configuration of a smart distribution vehicle capable of being applied to embodiments of the present disclosure.

Referring to FIG. 3, the smart distribution vehicle 110 may include a driving part 111, a sensing part 112, a loading part 113, a communication part 114, and a control part 115. Hereinafter, each component will be described.

The driving part 111 may include a driving source, a wheel, a suspension, and so on that are involved in moving, steering, and stopping the smart distribution vehicle 110. An electric motor supplied with electric power from an embedded battery (not illustrated) may be used as the driving source. The wheel may include at least one driving wheel that is supplied with a driving power from the driving source, and may include a non-driving wheel that is rotated by a movement of a vehicle body without receiving the driving power. According to the implementation of the wheel, when a plurality of driving wheels is provided, the driving source is matched for each of the driving wheels, so that the rotation of each of the driving wheels may be independently controlled. In this situation, the driving wheels may be configured such that rotation directions of different driving wheels are different from each other, so that steering is capable of being performed without a separate steering mechanism. At least some of the non-driving wheels may be configured as caster-type wheels, but these are exemplary and are not necessarily limited thereto.

The sensing part 112 is configured to detect an environment around the smart distribution vehicle 100 or an operation state of the smart distribution vehicle 100. Furthermore, the sensing part 112 may include at least one selected from: a 2D laser scanner (for example, a LiDAR), a 3D vision (stereo) camera, a multi-axis gyro sensor, an acceleration sensor, a wheel encoder, and a proximity sensor.

The encoder may use light emitted from a light-emitting element (for example, a light diode) and may output information capable of being used for determining how much the wheel is rotated. For example, the encoder may count the number of slits disposed along a circumferential direction on the wheel or a disk that is rotated with the wheel for a unit time. The control part 115 is capable of performing an odometry that estimates a displacement by analyzing a change in position relative to time with data acquired through the encoder and the gyro sensor. However, due to slip or wear of the wheel (change in a movement radius of the wheel), the displacement estimated based on the encoder data may have an error with the actual displacement. Therefore, when the odometry is performed, the control part 115 may perform a correction for noise and an error by using a predetermined algorithm (for example, EKF: Extended Kalman Filter) on the information collected from the wheel and the gyro sensor, and may output a result that has a tendency close to the actual value. Such odometry may be particularly useful when a current position determination (localization) using the 2D laser scanner to be described later is not possible.

The 2D laser scanner is capable of scanning the surrounding environment by radiating a laser around the surrounding area through a rotating reflector and by detecting a signal that is reflected and returned. At this time, a detection result in a point cloud form may be output by analyzing the time difference between the investigation/reception and the strength of the reflected signal.

The 3D vision camera may calculate a distance to an object based on a time difference between two cameras spaced apart from each other by a predetermined distance, that is, a pixel distance between images photographed through each of the cameras. At this time, a texture projector capable of projecting a predetermined pattern of infrared light so that a plane body (for example, a white wall) of the same color is capable of being detected may be provided.

Generally, the 2D laser scanner may be used for mapping, navigation, object recognition, and so on, and the 3D camera may be particularly used for avoidance of an obstacle during navigation, but this is an example and is not necessarily limited thereto.

The loading part 113 is a mechanism for loading an item to be transported. Furthermore, the loading part 113 may include a table which is as an upper plate of an upper portion of the vehicle body or which is disposed on the upper plate of the upper portion of the vehicle body, a lift, a turn table configured to be rotated along a vertical shaft, a forklift disposed, and a conveyor, or may be a combination thereof. The forklift may support a telescopic function and a tilting function, similar to a conventional forklift.

The communication part 114 may communicate with other components in the smart factory 100, such as the production device 120 and the control device 140, and may also support communication between the smart distribution vehicles 110, and may also communicate with the charger when a charging mission is performed.

The control part 115 is a subject that performs overall control of each of the components 111, 112, 113, and 114 described above, and may perform a control of a current mission, a current position, a destination determination, a path planning, the loading part, and so on based on information acquired from the control device 140 through the communication part 114.

FIG. 4 is a perspective view illustrating an example of an external appearance of the smart distribution vehicle capable of being applied to embodiments of the present disclosure.

Referring to FIG. 4, an example of the AMR is illustrated as the smart distribution vehicle 110. The vehicle body may have a track-type planar shape having a long axis that extends along a 1-axis direction. One driving wheel 111-1 may be disposed at a center portion of the vehicle body in the one-axis direction, may be disposed at a first side in a 2-axis direction, and the other driving wheel (not illustrated) may be disposed at a second side in the 2-axis direction such that the other driving wheel faces the driving wheel 111-1. Such an arrangement of the driving wheels may be referred to as a 'Differential Drive (DD)'. Although not illustrated in FIG. 4, at least two non-driving wheels may be disposed on a lower portion of the vehicle body. In this situation, when the two driving wheels are rotated at the same speed in the same direction, the driving wheels are capable of being moved forward or backward along the 1-axis direction, and when the driving wheels are rotated at the same speed in directions opposite to each other, the driving wheels may be rotated with respect to a rotation axis passing through a plane center C of the vehicle body. In addition, the sensing part 112 may be disposed on a front surface portion of the vehicle body, and the loading part 113 may be disposed on an upper surface portion of the vehicle body. The loading part 113 may be configured such that the loading part 113 is capable of being lifted along a 3-axis direction, and a rack, a tray, and so on may be fixed to an upper surface of the loading part 113 through a guide 113-1.

However, the shape of the AMR in FIG. 4 is an example, and it is of course clear that the AGV may have a similar shape, or the AMR may have a different shape.

Next, the driving process of the smart distribution vehicle 110 will be described with reference to FIG. 5.

FIG. 5 is a flowchart illustrating an example of the driving process of the smart distribution vehicle 110 capable of being applied to embodiments of the present disclosure. In FIG. 5, for convenience, it is assumed that the smart distribution vehicle 110 is the AMR capable of performing positioning and setting a local path.

Referring to FIG. 5, firstly, the AMR may acquire an actual grid map through a LiDAR and so on while the AMR is driving inside the smart factory 100 (S501).

When the AMR transmits the acquired grid map to the control device 140, a grid map editing and matching process may be performed in the map management part 148 of the control device 140 (S502). Here, the editing process may include a process of setting various zones described above in the grid map, a process of assigning a cost for each grid, and so on. Here, the assigning of the cost may be performed such that the cost is given higher as the AMR is positioned closer to an obstacle or an entry prohibition area so that the AMR does not move around the obstacle or to an area where the AMR should not enter. This is because, in setting a local path, the AMR selects a set of cells having the lowest cost between the waypoints as the path.

In addition, the map matching process may refer to a process of matching coordinates between a CAD map used in the design of the smart factory 100, the actual grid map (LiDAR map), and a topology map that has been edited.

Subsequently, the control device 140 may share the topology map to all of the AMRs in the factory through the communication part 146 (S503).

A subsequent process may be a process applied to the each of the AMRs.

The AMR may determine (localization) the current position of the AMR on the map by using sensor data of the sensing part 112 and the acquired map (S504). For example, the AMR may determine the current position by comparing the surrounding terrain and the map acquired through the LiDAR based on feature points.

The control device 140 may select a specific AMR and assign a mission to the specific AMR. Generally, in the mission, at least one waypoint determined through the global path planning may be given. The waypoint may be defined as coordinates on the map, and may be accompanied by information about a direction (i.e., heading) in which the AMR is to be directed at the coordinates. According to such a mission assignment, a destination may be set in the AMR (Yes in S505), and the AMR may perform the local path planning to the waypoint based on the cost in the topology map (S506).

When the path is determined, the AMR starts driving (S507). Furthermore, when an obstacle is detected through the sensing part 112 during the driving (Yes in S508), the AMR may perform an avoidance maneuver by performing a local path searching to bypass the detected obstacle (S509). The control device 140 may update the mission of the corresponding AMR according to a situation, the avoidance maneuver, or a failure of the avoidance maneuver.

In addition, the AMR may correct a position error during a movement by using the aforementioned odometry method while driving until the AMR reaches the destination (S510).

After that, when the AMR reaches the destination (S511), the AMR may perform a mission-based operation (S512). For example, the AMR may determine whether a condition for entering a specific process area is cleared, may collect an empty pallet at the destination, or may drop a load loaded on the loading part 113.

In an embodiment of the present disclosure, the smart distribution vehicle capable of stably fixing the pallet to the loading part regardless of the shape and the material of the pallet is proposed.

Hereinafter, the smart distribution vehicle according to an embodiment of the present disclosure will be described with reference to FIG. 6 and FIG. 7.

FIG. 6 is a perspective view illustrating an example of the external appearance of the smart distribution vehicle according to an embodiment of the present disclosure, and FIG. 7 is a block diagram illustrating an example of the configuration of the smart distribution vehicle according to an embodiment of the present disclosure. In FIG. 6, the 1-axis direction, the 2-axis direction, and the 3-axis direction correspond to front and rear directions, left and right directions, up and down directions of a smart distribution vehicle 110*a*, respectively.

Referring to FIG. 6 and FIG. 7 together, the smart distribution vehicle 110*a* may include a loading part 610, a loading fixing part 620, a sensing part 630, and a control part 640. The smart distribution vehicle 110*a* may be implemented as an unmanned forklift. However, the unmanned forklift shape in FIG. 6 is an example, and the smart distribution vehicle 110*a* may have a different shape.

The loading part 610 may be implemented as a forklift which is positioned at a front side of the smart distribution vehicle 110*a* and which is configured to transfer a pallet, and may include a carriage 610-1, a fork arm 610-2, and a fork 610-3.

The carriage 610-1 may be moved up and down along the 3-axis direction based on driving power of a driving source provided in the smart distribution vehicle 110*a*.

The fork arm 610-2 may be coupled to a front side of the carriage 610-1 such that the fork arm 610-2 supports a side surface of the pallet, may extend downward by a predetermined length, and may be positioned on both sides of the carriage 610-1 from a center portion of the carriage 610-1. The fork arm 610-2 may be moved up and down along the 3-axis direction together with the movement of the carriage 610-1 according to a forklift operation, and may be moved left and right along the 2-axis direction with respect to the center portion of the carriage 610-1 according to a fork shift operation.

The fork 610-3 may be coupled to each of the fork arms 610-2 such that the fork 610-3 supports a lower end surface of the pallet, and may extend toward a front side of the fork arm 610-2 by a predetermined length.

The loading fixing part 620 may include an electromagnet 621 for electrically fixing the pallet loaded on the loading part 610, and may include a clamp 622 for mechanically fixing the pallet loaded on the loading part 610. In the present embodiment, the electromagnet 621 may be configured such that a metal-type pallet is capable of being stably fixed to the loading part 610, and the clamp 622 may be configured such that the lower end surface of the pallet is capable of being physically fixed regardless of the metal-type pallet and the non-metal-type pallet.

The electromagnet 621 is mounted on front sides of each of the fork arms 610-2. Furthermore, when the metal-type pallet is loaded on the loading part 610, the electromagnet 621 is magnetized, so that the metal-type pallet is pulled. Furthermore, when the loaded metal-type pallet is unloaded from the loading part 610, the electromagnet 621 may return to an original state which is a non-magnetized state. The electromagnet 621 may be moved together with the carriage 610-1 during the fork shift operation and the forklift operation, thereby being capable of fixing the metal-type pallet.

The clamp 622 may be disposed adjacent to the fork arm 610-2. For example, the clamp 622 may have a gripper **622*a* which is coupled to a rear side of the carriage 610-1 and which extends downward by a predetermined length and which is positioned outside of each of the fork arms 610-2. The clamp 622 may be moved up and down along the 3-axis direction together with the carriage 610-1, or may be moved up and down along the 3-axis direction independently of the carriage 610-1. The gripper 622*a* may include a first contact part t in contact with a first side of the lower end surface of the pallet and a second contact part b in contact with a second side of the lower end surface of the pallet, the first contact part t and the second contact part b being configured to restrict a movement of the lower end surface of the pallet loaded on the loading part 610**. A distance between the first contact part t and the second contact part b may be adjusted by a motor according to a thickness of the lower end surface of the pallet.

The sensing part 630 may include a seating detection sensor 631 and a magnetic detection sensor 632, and may be disposed on front sides of each of the fork arms 610-2.

The seating detection sensor 631 may be implemented as a push-button switch in an on-off type that detects whether the pallet is loaded on the fork arm 610-2.

In order to distinguish whether a pallet loaded on the loading part 610 is a metal-type pallet or a non-metal-type pallet, the magnetic detection sensor 632 may detect whether a pallet positioned in the front side of the fork arm 610-2 has a magnetic property.

When a pallet is loaded on the fork 610-3 that extends toward a front side of the fork arm 610-2 coupled to the carriage 610-1, the control part 640 may determine whether the pallet is seated on the form arm 610-2 according to the on-off of the seating detection sensor 631. More specifically, when the seating detection sensor 631 is turned on, the control part 640 determines that the pallet is seated on the fork arm 610-2. Furthermore, when the seating detection sensor 631 is turned off, the control part 640 determines that the pallet is not seated on the fork arm 610-2, so that a position of the pallet may be adjusted through the loading part 610.

When the control part 640 determines that the pallet is seated on the fork arm 610-2, the control part 640 may determine whether the pallet has a magnetic property by using the magnetic detection sensor 632 positioned on the front side of the fork arm 610-2, and may control whether the control part 640 supplies a current to the electromagnet 621 mounted on the front side of the fork arm 610-2 according to a determination result. More specifically, when the control part 640 determines that the pallet has a magnetic property through the magnetic detection sensor 632 (that is, when the pallet is determined to be a metal-type pallet), the control part 640 may magnetize the electromagnet 621 by supplying a current to the electromagnet 621 so that an attraction force acts on the electromagnet 621 and the metal-type pallet. In contrast, when the control part 640 determines that the pallet does not have a magnetic property through the magnetic detection sensor 632 (that is, when the pallet is determined to be a non-metal-type pallet), the control part 640 may block a current supplied to the electromagnet 621.

In addition, when the control part 640 determines that the pallet is seated on the fork arm 610-2, the control part 640 may control a grip of the gripper **622*a* provided on the clamp 622 coupled to the carriage 610-1 so that a movement of the pallet is restricted. In order to control the grip of the gripper 622*a*, the control part 640 may physically fix the lower end surface of the pallet by adjusting the distance, based on a torque of the motor (not illustrated), between the first contact part t and the second contact part b provided on the gripper 622*a***.

Meanwhile, since the thickness of the lower end surface of the pallet varies according to the type of the pallet, the control part 640 may adjust the distance between the first contact part t and the second contact part b provided on the gripper **622*a*** according to the thickness of the lower end surface of the pallet.

The control part 640 according to the present embodiment may detect the torque of the motor in order to adjust the distance between the first contact part t and the second contact part b provided on the gripper **622*a*** according to the thickness of the lower end surface of the pallet without a separate sensor detecting the thickness of the lower end surface of the pallet.

The control part 640 may determine whether the gripper **622*a* performs a normal grip by detecting whether the torque of the motor reaches a target torque. Here, when the gripper 622*a* normally performs the grip, the torque of the motor may have the same value as the target torque corresponding to the thickness of the lower end surface of the pallet. Furthermore, when the gripper 622*a*** performs the grip abnormally, the torque of the motor may have a value lower than the target torque.

That is, when the torque of the motor reaches the target torque, the control part 640 may determine that the grip of the gripper **622*a* is performed normally. On the other hand, when the torque of the motor does not reach the target torque, the control part 640 may determine that the grip of the gripper 622*a* is performed abnormally, and may adjust the position of the clamp 622 up and down along the 3-axis direction and then may control the grip of the gripper 622*a*** again.

FIG. 8 is a view illustrating an example of a process in which a seating detection sensor according to an embodiment of the present disclosure detects whether a pallet is seated on a fork arm.

FIG. 8 shows situations in which any one of the two seating detection sensors 631 fails to detect whether the pallet is seated on the fork arm 610-2 as the pallet loaded on the loading part 610 is misaligned. The left side in FIG. 8 shows a situation in which the seating detection sensor 631 positioned on a first side on the 2-axis direction fails to detect whether the pallet is seated, and the right side in FIG. 8 shows a situation in which the seating detection sensor 631 positioned on a second side on the 2-axis direction fails to detect whether the pallet is seated. In these situations, the control part 640 determines that the pallet is not seated on the fork arm 610-2, and the control part 640 may re-adjust the position of the pallet through the loading part 610.

FIG. 9 is a view illustrating an operation of the seating detection sensor 631 implemented as a push-button switch according to an embodiment of the present disclosure.

The left side in FIG. 9 corresponds to a situation in which the seating detection sensor 631 is turned off as a pallet p is not seated on the fork arm 610-2, and the right side in FIG. 9 corresponds to a situation in which the seating detection sensor 631 is turned on as the pallet p is seated on the fork arm 610-2.

FIG. 10 is a circuit diagram illustrating an example of an electromagnet control system included in the smart distribution vehicle according to an embodiment of the present disclosure.

Referring to FIG. 10, the smart distribution vehicle may include the electromagnet 621, the control part 640, a power supply device 650, and an electronic switch sw. The power supply device 650 may be implemented as a battery, and the electronic switch sw may be implemented as a transistor, but are not necessarily limited thereto.

The power supply device 650 may supply a current to the electromagnet 621 when the electronic switch sw is turned on.

The electronic switch sw is connected between a first end of the power supply device 650 and a first end of the electromagnet 621, so that a turned-on state of the electronic switch sw is capable of being controlled by the control part 640.

The control part 640 may determine whether a pallet has a magnetic property through the magnetic detection sensor 632, and may control the turned-on state of the electronic switch sw according to a determination result.

More specifically, when the control part 640 determines that the pallet has a magnetic property, the control part 640 may control the electronic switch sw such that the electronic switch sw is in the turned-on state. Accordingly, the power supply device 650 may supply a current to the electromagnet 621.

In contrast, when the control part 640 determines that the pallet does not have a magnetic property, the control part 640 may control the electronic switch sw such that the electronic switch sw is in a turned-off state. Accordingly, the current supplied from the power supply device 650 to the electromagnet 621 may be cut off.

FIG. 11 is a view illustrating an example of a process in which a clamp according to an embodiment of the present disclosure grips a lower end surface of the pallet. Referring to FIG. 11, the gripper 622*a* provided on the clamp 622 includes the first contact surface t and the second contact surface b, and the control part 640 may adjust a distance d between the first contact surface t and the second contact surface b according to a thickness th of a lower end surface 660-1 of a pallet 660. Accordingly, the lower end surface 660-1 of the pallet 660 may be physically fixed by the gripper 622*a*.

FIG. 12 is a flowchart illustrating a control method for a smart distribution vehicle according to an embodiment of the present disclosure.

Referring to FIG. 12, the loading part 610 may load a pallet on the fork 610-3 by the control part 640 (S1201).

When the pallet is loaded on the fork 610-3, the control part 640 may determine whether the pallet is seated on the fork arm 610-2 by using the seating detection sensor 631 (S1202). As described above, the seating detection sensor 631 may be implemented as a push-button switch disposed on the front side of the fork arm 610-2, and the control part 640 may determine whether the pallet is seated on the fork arm 610-2 according to the on-off of the seating detection sensor 631.

When the seating detection sensor 631 is turned off (NO in S1202), the control unit 640 determines that the pallet is not seated on the fork arm 610-2, and the position of the pallet may be adjusted by the loading part 610 (S1203). Then, the S1202 process may be performed again.

When the seating detection sensor 631 is turned on (YES in S1202), the control part 640 may determine that the pallet is seated on the fork arm 610-2.

When it is determined that the pallet is seated on the fork arm 610-2 (YES in S1202), the control part 640 may determine whether the pallet has a magnetic property by using the magnetic detection sensor 632 disposed on the front side of the fork arm 610-2, and may control whether the control part 640 supplies a current to the electromagnet 621 mounted on the front side of the fork arm 610-2 according to the determination result (S1204). As described above, by controlling the turned-on state of the electronic switch sw connected between the electromagnet 621 and the power supply device 650 according to the magnetic property of the pallet, the control part 640 may supply or block a current to the electromagnet 621.

When it is determined that the pallet has a magnetic property (YES in S1204), the control part 640 may magnetize the electromagnet 621 by supplying a current to the electromagnet 621 so that the attraction force acts on the electromagnet 621 and the metal-type pallet (S1205).

When it is determined that the pallet does not have a magnetic property (NO in S1204), the control part 640 may block the current supplied to the electromagnet 621.

When it is determined that the pallet is seated on the fork arm 610-2 (YES in S1202), the control part 640 may control the grip of the gripper 622*a* provided on the clamp 622 disposed adjacent to the fork arm 610-2 so that the movement of the pallet is restricted (S1206). As described above, in order to control the grip of the gripper 622*a*, the control part 640 may physically fix the lower end surface of the pallet by adjusting the distance between the first contact part t and the second contact part b provided on the gripper 622*a* based on the torque of the motor.

After that, the control part 640 may determine whether the gripper 622*a* performs a normal grip by detecting whether the torque of the motor reaches the target torque (S1207).

When the torque of the motor reaches the target torque (YES in S1207), the control part 640 may determine that the grip of the gripper 622*a* is performed normally.

When the torque of the motor does not reach the target torque (NO in S1207), the control part 640 determines that the grip of the gripper 622*a* is performed abnormally, and may perform the S1206 process again after adjusting the position of the clamp 622 up and down.

The present disclosure described above may be embodied as a computer-readable code on a medium in which a program is recorded. A computer-readable medium includes all types of recording devices in which data readable by a computer system is stored. Examples of the computer-readable medium include a Hard Disk Drive (HDD), a Solid-State Drive (SSD), a Silicon Disk Drive (SDD), a Read-Only Memory (ROM), a Random-Access Memory (RAM), a CD-ROM, a magnetic tape, a floppy disk, an optical data storage device, and so on. Therefore, the foregoing detailed description should not be construed as restrictive but be considered illustrative in all respects. The scope of the present disclosure should be determined by a reasonable interpretation of the appended claims, and all modifications within the equivalent scope of the present disclosure are considered included in the scope of the present disclosure.

DESCRIPTION OF REFERENCE NUMERALS

100: Smart Factory 110: Smart distribution vehicle
120: Production device 130: Detection device
140: Control device

The invention claimed is:

1. A smart distribution vehicle comprising:
a fork arm;
a fork which is coupled to the fork arm and which extend toward a front side of the fork arm;
an electromagnet mounted on the front side of the fork arm;
a clamp disposed adjacent to the fork arm and which has a gripper for restricting a movement of the object loaded on the fork, wherein the gripper comprises a first contact part that is in contact with a first side of a lower end surface of the object and a second contact part that is in contact with a second side of the lower end surface of the object; and
a control part including a processor and configured to:
control whether to supply a current to the electromagnet by determining whether an object has a magnetic property in response that the object is seated on the fork arm;
control a grip of the gripper in response that the object is seated on the fork arm, and
adjust a distance between the first contact part and the second contact part based on a torque of a motor in response that the object is seated on the fork arm, thereby controlling the grip of the gripper.

2. The smart distribution vehicle of claim 1, further comprising a push-button switch disposed on the front side of the fork arm,
wherein the control part is configured to determine whether the object is seated on the fork arm according to an on-off of the push-button switch.

3. The smart distribution vehicle of claim 1, further comprising a magnetic detection sensor disposed on the front side of the fork arm,
wherein the control part is configured to determine whether the object has the magnetic property through the magnetic detection sensor.

4. The smart distribution vehicle of claim 1, wherein the control part is configured to control the electromagnet to fix the object when it is determined that the object has the magnetic property.

5. The smart distribution vehicle of claim 4, further comprising:
a power supply device; and
an electronic switch connected between the electromagnet and the power supply device,
wherein the control part is configured to control the electronic switch such that the electronic switch is in a turned-on state in response that it is determined that the object has the magnetic property.

6. The smart distribution vehicle of claim 5, wherein the control part is configured to control the electronic switch such that the electronic switch is in a turned-off state in response that it is determined that the object does not have the magnetic property.

7. The smart distribution vehicle of claim 1, wherein the control part is configured to determine whether the gripper performs the grip normally by detecting whether the torque of the motor reaches a target torque, and
the control part is configured to adjust a position of the clamp in response that the torque of the motor does not reach the target torque.

8. A method for controlling a smart distribution vehicle, the method comprising:
loading an object on a fork that extends toward a front side of a fork arm;
detecting whether the object is seated on the fork arm in response that the object is loaded on the fork;
controlling whether to supply a current to an electromagnet mounted on the front side of the fork arm by determining whether the object has a magnetic property in response that the object is seated on the fork arm; and
controlling a grip of a gripper in response that the object is seated on the fork arm, the gripper being provided on a clamp that is disposed adjacent to the fork arm;
wherein the controlling the grip comprises adjusting a distance between a first contact part and a second contact part based on a torque of a motor, the first contact part and the second contact part being provided on the gripper.

9. The method of claim 8, wherein the detecting comprises determining whether the object is seated on the fork arm according to an on-off of a push-button switch disposed on the front side of the fork arm.

10. The method of claim 8, wherein the controlling whether to supply the current comprises determining whether the object has the magnetic property through a magnetic detection sensor disposed on the front side of the fork arm.

11. The method of claim 8, wherein the controlling whether to supply the current comprises:
magnetizing the electromagnet by supplying the current to the electromagnet so that an attraction acts on the electromagnet and the object in response that it is determined that the object has the magnetic property; and
blocking the current supplied to the electromagnet in response that it is determined that the object does not have the magnetic property.

12. The method of claim 8, wherein controlling whether to supply the current further comprises controlling a turned-on state of an electronic switch according to the magnetic property of the object, the electronic switch being connected between the electromagnet and a power supply device.

13. The control method of claim 8, further comprising:
determining whether the gripper performs the grip normally by detecting whether the torque of the motor reaches a target torque; and
adjusting a position of the clamp in response that the torque of the motor does not reach the target torque.

* * * * *